United States Patent [19]

Sharpe et al.

[11] Patent Number: 4,713,761
[45] Date of Patent: Dec. 15, 1987

[54] SYSTEM FOR CENTRALIZED PROCESSING OF ACCOUNTING AND PAYMENT FUNCTIONS

[75] Inventors: Murem S. Sharpe, Stamford; Eugene Bryson, Redding; Flavio Manduley, Woodbury; Eben M. Riordan, II, Southport; Brian D. Flesser, Norwalk, all of Conn.

[73] Assignee: Pitney Bowes, Inc., Stamford, Conn.

[21] Appl. No.: 756,420

[22] Filed: Jul. 18, 1985

[51] Int. Cl.$^4$ ............................................. G06F 15/24
[52] U.S. Cl. .................................. 364/406; 340/825.26; 340/825.35
[58] Field of Search ......................... 364/400, 401–403, 364/406–408, ; 235/379, 385, 375, 381; 340/825.35, 825.26, 825.27

[56] References Cited

U.S. PATENT DOCUMENTS

| | | | |
|---|---|---|---|
| 3,573,747 | 4/1971 | Adams | 364/300 |
| 3,718,764 | 2/1973 | Deschenes et al. | 179/2 DP |
| 3,920,908 | 11/1975 | Krause | 179/2 CA |
| 3,956,615 | 5/1976 | Anderson et al. | 235/61.7 |
| 3,976,840 | 7/1976 | Cleveland | 179/2 DP |
| 4,097,923 | 6/1978 | Eckert et al. | 364/800 |
| 4,212,069 | 7/1980 | Baumann | 364/467 |
| 4,247,759 | 1/1981 | Yums et al. | 235/381 |
| 4,346,441 | 7/1983 | Musmanno | 364/408 |
| 4,376,978 | 3/1983 | Musmanno | 364/408 |
| 4,412,287 | 10/1983 | Braddock | 364/300 |
| 4,420,819 | 12/1983 | Price et al. | 364/900 |
| 4,449,186 | 5/1984 | Kelly et al. | 364/407 |
| 4,477,890 | 5/1984 | Duwell et al. | 364/900 |
| 4,491,725 | 1/1985 | Pritchard | 235/375 |
| 4,567,359 | 6/1986 | Lockwood | 235/381 |

FOREIGN PATENT DOCUMENTS

| | | | |
|---|---|---|---|
| 0014313 | 8/1980 | European Pat. Off. | 364/401 |
| 2543327 | 9/1984 | France | 364/4 |
| 0061942 | 5/1977 | Japan | 235/385 |

OTHER PUBLICATIONS

Unpublished Descriptions of Marketing Concepts.
Numerax Advertising Brochure.
"Shipping a la Modem", T. L. Dulancy, H & SM, May 1985.
"Modems and Icebergs", T. C. Dulancy, H & SM, Jun. 1985.
"Muscle for Modems", T. C. Dulancy, H & SM, Jul. 1985.

Primary Examiner—Jerry Smith
Assistant Examiner—Gail Hayes
Attorney, Agent, or Firm—Robert H. Whisker; Melvin J. Scolnick; David E. Pitchenik

[57] ABSTRACT

A system for determining and accounting for the costs of transactions. The system is particularly suited for determining and accounting the costs of shipping goods. The system includes an input device which is located at the shipper's (or other buyer's) premises and a central data processing facility. The input device receives information defining a shipment sufficiently so that the cost of that shipment may be determined in accordance with the rates of a carrier (or other seller), and uploads the information to the central data processing facility. Preferably, the input device includes rate information and software for determining shipment costs locally. The central data processing facility maintains accounts for a shippers and carriers, appropriately debits and credits costs for each shipment and periodically issues statements of their accounts to all shippers and carriers. In a preferred embodiment, shippers may maintain a payment account with a trustee bank and the system may from time to time issue instruction to the trustee bank to make appropriate payments to each carrier. In another embodiment, carriers may from time to time enter new rate information into the system.

16 Claims, 9 Drawing Figures

FIG. 7

SHIPMENT REPORT FOR PERIOD COVERING 02/25/85 THRU 03/01/85 — 502, 504

SHIPPER NAME: PITNEY BOWES INC.
WHEELER GROUP
ADDRESS: 1212 WEST 8TH ST.
NEW HARTFORD, CT 06832-5609 — 506

REPORT SUMMARY — 508

| TOTALS: CARRIERS | CONSIGNMENT | PIECES | SPEC. FEES | MISC. FEES | P/U FEES | STD CHARGES | CREDITS | AMOUNT |
|---|---|---|---|---|---|---|---|---|
| 5 | 26 | 6,012 | $ 75.00 | $ 35.95 | $ 16.50 | $ 24,020.00 | $ 37.50 | $ 24,109.95 |

PITNEY BOWES INC. ACCOUNT DEBITS FOR THIS PERIOD $ 24,109.95

SHIPMENT BREAKDOWN BY CARRIERS — 510

| CARRIERS | PIECES | SPEC. FEES | MISC. FEES | STD CHARGES | AMOUNT |
|---|---|---|---|---|---|
| FEDERAL | 650 | $ 75.00 | $ 0 | $ 6,575.00 | $ 6,650.00 |
| UPS | 2,012 | $ 0 | 35.95 | $ 8,001.00 | $ 8,036.95 |
| USPS | 3,009 | $ 0 | 0 | $ 7,015.00 | $ 7,015.00 |
| EMERY | 250 | $ 0 | 0 | $ 2,150.00 | $ 2,150.00 |
| YELLOW FREIGHT | 91 | $ 0 | 0 | 258.00 | 258.00 |

FIG. 8

SHIPMENT REPORT FOR PERIOD COVERING 02/25/85 THRU 03/01/85

512 →

| CARRIER NAME: | UPS | | | | | 01 PRIORITY 1 | 0 AOD |
|---|---|---|---|---|---|---|---|
| | | | | | | 02 OE UP TO 2 | 1 COD |
| | | | | | | 03 OB UP TO 5 | 2 DCL VAL |
| ADDRESS: | 1212 NORTH EAST ST. | | | | | 04 OT UP TO 5 | 3 OVER WGHT |
| | NEW CALIFORNIA, CT 06834-4468 | | | | | 05 2ND DAY AIR | 4 SPECIAL |
| | | | | | | 06 OVERNIGHT | |

514 →  516 →

518 →

| SHIPMENTS | PIECES | SPEC. FEES | MISC. FEES | PICK-UP FEES | SHIPPER CREDIT | TOTAL AMOUNT |
|---|---|---|---|---|---|---|
| 15 | 1023 | $ 160.00 | $ 7.65 | $ 3.50 | $ 3.50 | $ 3215.98 |

SHIPMENT DETAIL

520 →

| DATE | INVOICE NUMBER | MODE | PIECES | WEIGHT | DEST. ZIP/ZONE | SPEC FEES | STD CHARGES | AMOUNT |
|---|---|---|---|---|---|---|---|---|
| 02/26/85 | 43E567XYZ456 | 02 | 20 | 110 | 23496/A | 0 $ 1.25<br>1 $ 14.95<br>2 $ 3.00<br>3 $ 1.25 | $ 59.50 | $ 79.95 |
| 02/26/85 | 5467XRXYZ456 | 02 | 7 | 75 | 75006/B | 0 $ 1.75<br>2 $ 3.25<br>3 $ .95 | $ 39.75 | $ 45.70 |
| 02/26/85 | 5467XrXYZ456 | 02 | 1 | 10 | 75010/B | $ .00 | $ 3.10 | $ 3.10 |
| 02/27/85 | 5467XRXYZ995 | 01 | 1 | 5 | 05010/C | $ .00 | $ 2.70 | $ 2.70 |
| 02/27/85 | 5467XRXYZ996 | 01 | 1 | 5 | 65010/B | $ .00 | $ 2.10 | $ 2.10 |

FIG. 9

ACCOUNT ACTIVITY REPORT FOR PERIOD COVERING 02/25/85 THRU 03/01/85

DETAIL REPORT

| SHIPPER ACCOUNT # | ABC1X679 | TYPE 01 | CONTACT: Mr. Joe Smith |
| --- | --- | --- | --- |
| NAME: | PITNEY BOWES INC. | CONTRACT # 333214 | TEL : (203) 854-5555 EXT. 9000 |
| | Wheeler Group | | |
| ADDRESS: | 1212 West 8th St. | | |
| | New Hartford, CT 06832-5609 | | |

| BEGINNING BALANCE | DEPOSIT | CREDITS | EXPENDITURES | ENDING BALANCE |
| --- | --- | --- | --- | --- |
| $72,250.00 | $5,000.00 | $ 3.50 | $ 3,215.98 | $74,037.52 |

ACCOUNT ACTIVITY

| DATE: | | | | CURRENT BALANCE |
| --- | --- | --- | --- | --- |
| 02/25/85 | 000 | BEG BALANCE | | $ 72,250.00 |
| 02/27/85 | 001 | DEPOSIT | $ 3,500.00 | $ 75,750.00 |
| 02/27/85 | 010 | EXPENSE | ($ 3,215.98) | $ 72,534.02 |
| 02/28/85 | 002 | DEPOSIT | $ 1,500.00 | $ 74,034.02 |
| 02/28/85 | 101 | DEPOSIT | $ 3.50 | $ 74,037.52 |
| | | CK # 6630 B993 | | |
| | | CK # PB135872 | | |
| | | SRB # 3323 YELLOW FREIGHT | | |
| | | SRC # YF01234 YELLOW FREIGHT | | |
| 03/01/85 | 009 | END BALANCE | | $ 74,037.52 |

SYSTEM FOR CENTRALIZED PROCESSING OF ACCOUNTING AND PAYMENT FUNCTIONS

DEFINITIONS

In the present application, the terms listed below will be used with the following meanings when used with initial capitals.

Transaction—The purchase of an item of goods and/or services by a buyer from a seller.

Shipment—A Transaction wherein a shipper (buyer) purchases transportation services for goods and/or documents from a carrier (seller). A Shipment may include supplemental or ancillary Transactions.

Item Information—Information, other than the cost of the Transaction, which identifies the item in a Transaction.

Piece Information—Item Information, other than the cost of the Shipment, which identifies the transportation services in a Shipment.

Rates—Schedules and/or algorithms for computing costs, to the buyer, of a Transaction. Rates may include discount schedules and/or algorithms for determing reductions in standard costs. Such reductions (hereinafter Discounts) may take the form of immediate reductions in standard costs or latter issuance of credits or rebates from a seller to a buyer.

Rating—Determining the cost, to the buyer, of a Transaction from Item Information and the Rates of a seller.

Audit—Reconciliation of a seller's bills by or on behalf of a buyer to avoid overpayment.

Transaction (Shipment) Information—Information defining goods and/or services in a Transaction (Shipment) at least sufficiently so that the standard cost of the Transaction (Shipment) may be determined, and buyer (Shipper) identification, if more than one, and seller (carrier) identification, if more than one.

Producing Transaction (Shipment) Information—Assembling and formatting Item (Piece) Information about a Transaction (Shipment) in a pre-determined format for further processing. May include a Rating function so that Transaction Information produced includes the cost of the Transaction (Shipment).

Determining Transaction (Shipment) Costs—Either directly taking the cost from Rated Transaction Information, or Rating unrated Transaction Information.

Bill of Lading—Information defining items in a particular consignment at least sufficiently so that the cost for that consignment may be determined; also serves as a receipt for goods delivered to a carrier.

Manifest—Bill of Lading information plus shipping costs.

Freight Bill—Bill from a carrier to a shipper for shipping costs for one or more consignments.

BACKGROUND OF THE INVENTION

The subject invention relates to data processing systems for accounting for the costs of Transactions. More particularly, it relates to a data processing system for centrally handling the accounting and payment functions in the shipping industry FIG. 1 shows, in highly simplified form, a typical flow of goods, information, and funds between shippers and carriers. A Shipper 10, which includes a Shipping Department 12 and a Accounts Payable Department 14, delivers goods with a Bill of Lading to a Carrier 20. Simultaneously, Shipping Department 12 transmits the Bill of Lading to Accounts Payable Department 14. From the information on the Bill of Lading, and possibly other Bills of Lading, Carrier 20 periodically determines the amounts it believes it is owed by Shipper 10 and submits a Freight Bill to Accounts Payable Department 14. Department 14 Audits the Freight Bills and, if considered correct, issues payment to Carrier 20. When it is considered that Shipper 10 and Carrier 20 each also deal with numerous other carriers and shippers respectively, the enormous complexity of the network defined by the transportation industry may easily be appreciated. Further, though not shown in FIG. 1, the need to Rate each shipment also greatly complicates the task of Carrier 20 and Accounts Payable Department 14. Rating involves the determination of the shipping costs for each item shipped as a function both of information about that item, such as weight, size, destination, type of goods, applicable Discounts, etc., and the rates of a particular carrier. Rating is usually double checked, at least on a sampling basis, during the Audit function to avoid overpayment by the shipper. (Alternatively, the shipper may perform the original Rating, in which case the carrier will find it necessary to double check.)

Numerous attempts have been made to simplify the accounting and payment task depicted in FIG. 1. A nonprofit organization known as "The Transportation Data Coordinating Committee" (TDCC) has developed and promulgated a standard for the electronic exchange of information among shippers, carriers and other members of the transportation industry. This standard is essentially a set of electronic "forms" which members of the industry may use for electronic communication. While clearly a great step forward, the standard by itself does no more than replace paper forms with copper wires and does nothing to reduce the inherent complexity of the network shown in FIG. 1 or the difficulty of the tasks performed by carriers and shippers in accounting and paying for transportation. A corporation doing business as Trans Payment, Inc. provides a central switch or protocol converter, to facilitate use of the TDCC standard While again perhaps representing a step forward such a switch does not reduce the complexity of the network of FIG. 1 or of the tasks of the carriers and shippers.

Freight agents and forwarders who arrange and schedule shipments for shippers are known. Such agents and forwarders also receive freight bills from carriers and pass them on to shippers.

A company doing business as Numerex, Inc. provides a third party service for auditing freight bills. Essentially, Numerex provides a third party Accounts Payable Department. Such third party Accounts Payable services have also been provided by banks. Numerex is also believed to provide a computerized third party Rating service.

Those skilled in the art will readily recognize that none of the services provided by any of the above-described organizations operates to change the essential nature of the network described in FIG. 1. Accordingly, it is an object of the subject invention to provide a system which will simplify the flow of information and payments between shippers and carriers.

It is a further object of the subject invention to provide a system which will reduce or eliminate the need for duplication of effort in Rating of shipments.

It is still a further object of the subject invention to provide a system which may be operated by a third party not involved in providing the goods and/or services which are the subject of the Shipment or other Transaction.

It is still another object of the subject invention which will allow shippers (buyers) and carriers (sellers) to control the "float" (i.e., funds left on deposit to cover future expenditures) in payments due by agreement.

Other objects and advantages of the subject invention will be apparent to those skilled in the art from consideration of the attached drawings and the detailed description set forth below.

BRIEF DESCRIPTION OF THE DRAWINGS

FIGS. 7-9 show various reports generated by data processing center 30 for users of the system of the subject invention.

DETAILED DESCRIPTION OF PREFERRED EMBODIMENTS OF THE SUBJECT INVENTION

Figure 1:
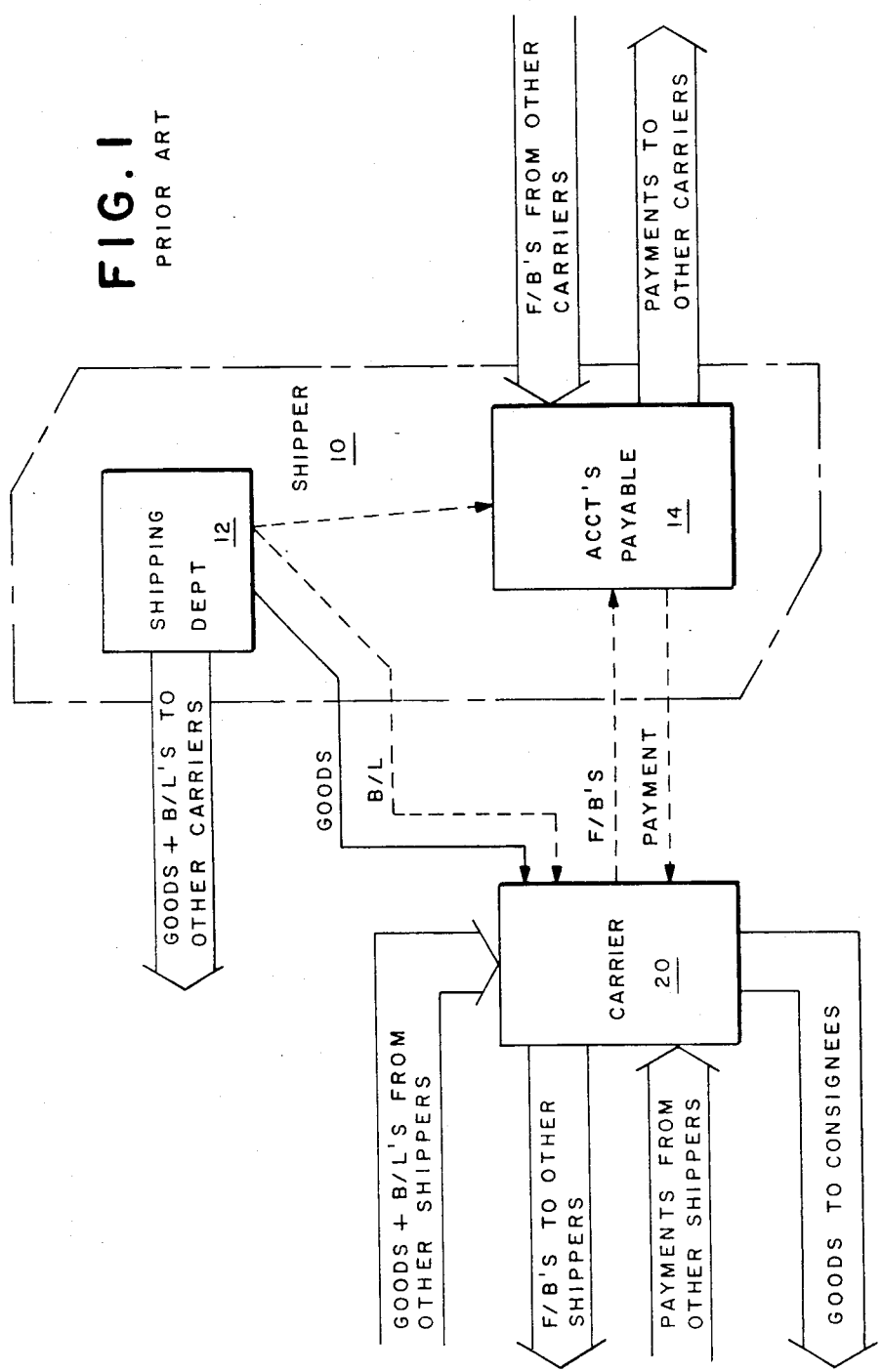
FIG. 1 shows a schematic representation of the typical flow of goods and information in the shipment industry.
Figure 2:
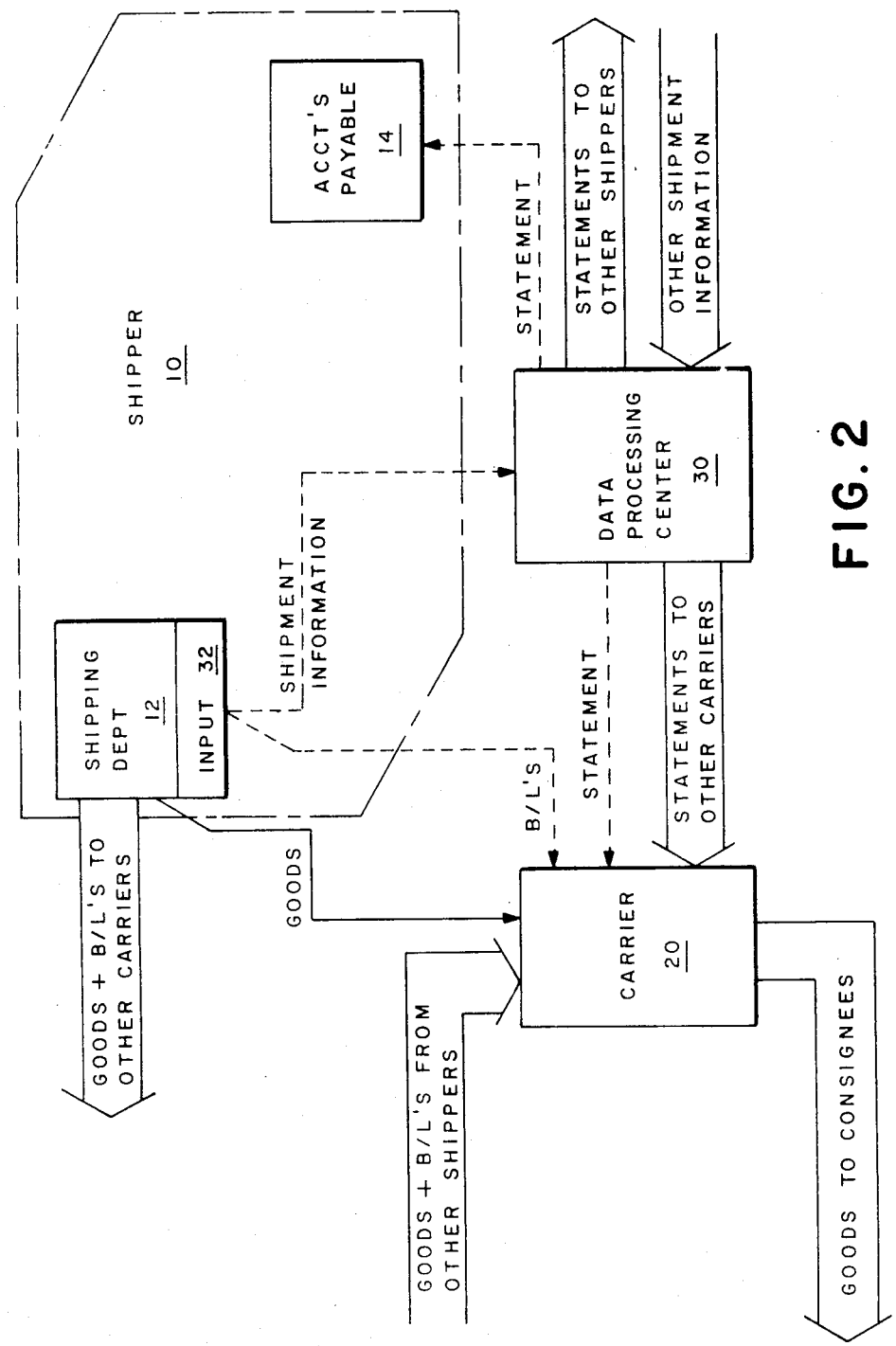
FIG. 2 shows a schematic representation of the flow of goods and information in the shipment industry between shippers and carriers using an embodiment of the subject invention.

FIG. 2 shows in simplified schematic form the flow of goods, information, and payments between shippers and carriers who utilize a system in accordance with the subject invention. In the system shown in FIG. 2, a Data Processing Center 30 is provided at a central location and an Input Device 32 is provided at the Shipping Department 12 of Shipper 10. Shipping Department 12 uses Input Device 32 to input Piece Information for the goods of a shipment. Input device 32 produces a Shipment Information which is transmitted to Data Processing Center 30. (It is within the contemplation of the subject invention that the Rating function may be carried out either locally by Input Device 32 or centrally by Data Processing Center 30 using current carrier rates which are stored at the appropriate location in a manner which will be more fully described below.) Goods and Bills of Lading are delivered to Carrier 20 as in FIG. 1. However, the Bill of Lading delivered to Carrier 20 is only necessary for physical control of the goods, though of course Carrier 20 may use it to check on the operation of the system of the subject invention. Data Processing Center 30 receives the Shipment Information and Rates the shipment if this function has not already been performed by Input Device 32. Data Processing Center 30 operates to maintain accounts for Shipper 10 and Carrier 20, as well as all other shippers and carriers who use the system and updates these accounts, or databases, each time Shipment Information is received from Input Device 32. Data Processing Center 30 debits the account of Shipper 10 and credits the account of Carrier 20 for the amount of the shipping costs. Periodically, Data Processing Center 30 issues statements of accounts receivable to Carrier 20 as well as all other carriers using the system and statements of accounts payable to Shipper 10 as well as all other shippers using the system. Thus, Shipper 10 and Carrier 20 each periodically receive a single statement of all amounts due them and payable by them, respectively; greatly simplifying the accounting function associated with the transportation of goods both for Shipper 10 and Carrier 20.

Figure 3:
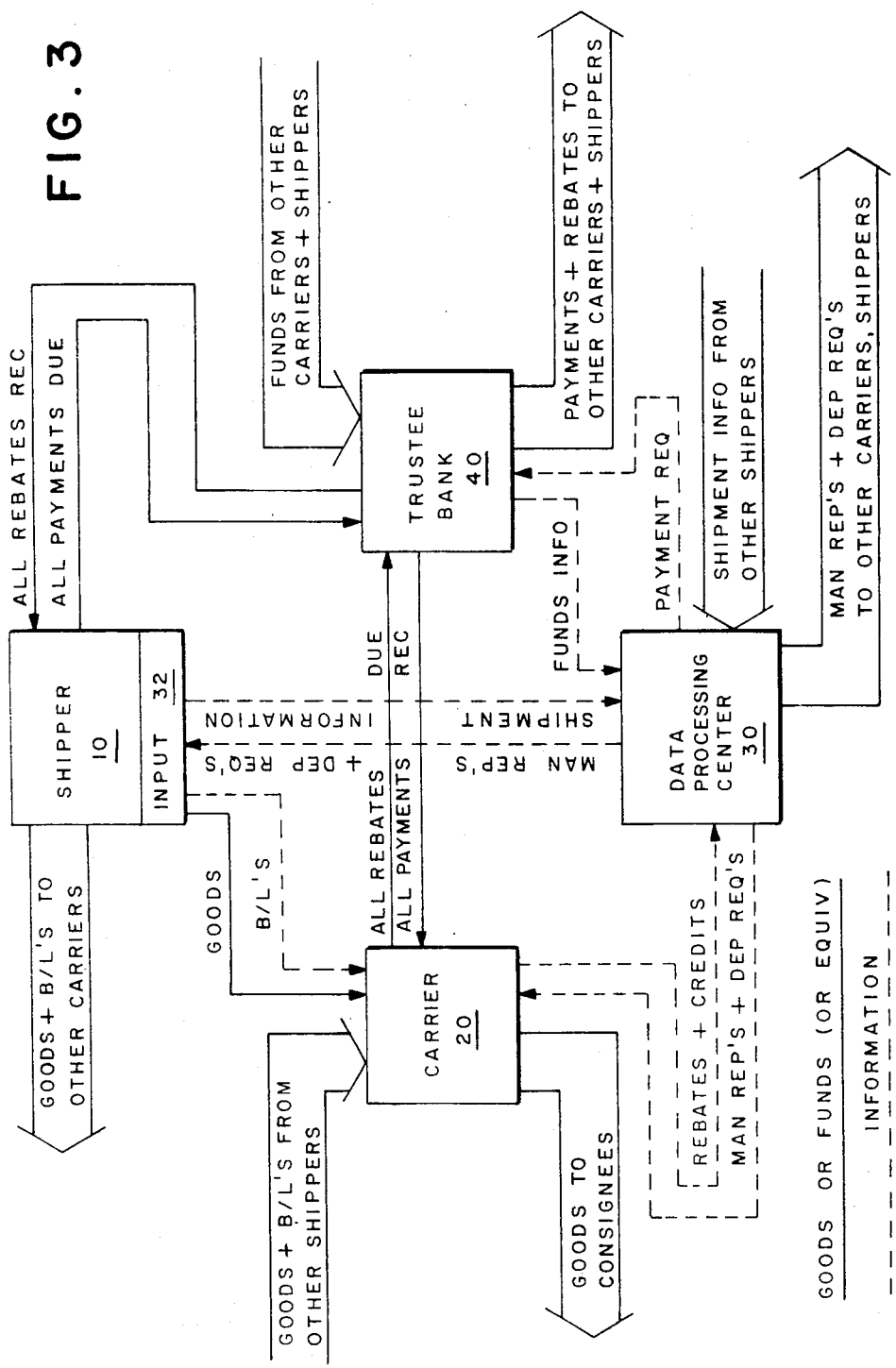
FIG. 3 shows a schematic representation of the flow of goods and information in the shipment industry between shippers and carriers using another embodiment of the subject invention having expanded capabilities including the capability to handle payment, rebate and credit functions.

However, those skilled in the art will recognize that the simplified system of FIG. 2 still leaves the billing and payment functions to be handled by Shipper 10 and Carrier 20. Thus the expanded system according to the subject invention as shown in FIG. 3 may be used to further simplify the accounting and payment function for the transportation of goods. The system of FIG. 3 operates substantially in the same manner with respect to Shipper 10 and Carrier 20 as the system of FIG. 2 but includes additional paths for communicating with a Trustee Bank 40. Shipper 10, and all other shippers who use the system, periodically, or on an as needed basis, deposit funds to accounts maintained in Trustee Bank 40 which acts as custodian. Trustee Bank 40 communicates information concerning the funds available to Shipper 10, and other shippers, to Data Processing Center 30. From time to time, Data Processing Center 30 will issue payment directions to Bank 40 to appropriately debit the accounts of the shippers who use the system and issue appropriate payments to the carriers who use the system. Thus, Shipper 10 need only make payments to bank 40 while Carrier 20 will receive a single payment for the total amount due from all shippers. Consideration of the system shown in FIGS. 2 and 3 will provide those skilled in the art with an understanding of how systems in accordance with the subject invention operate to simplify the accounting and payment function involved in the transportation of goods.

Figure 4:
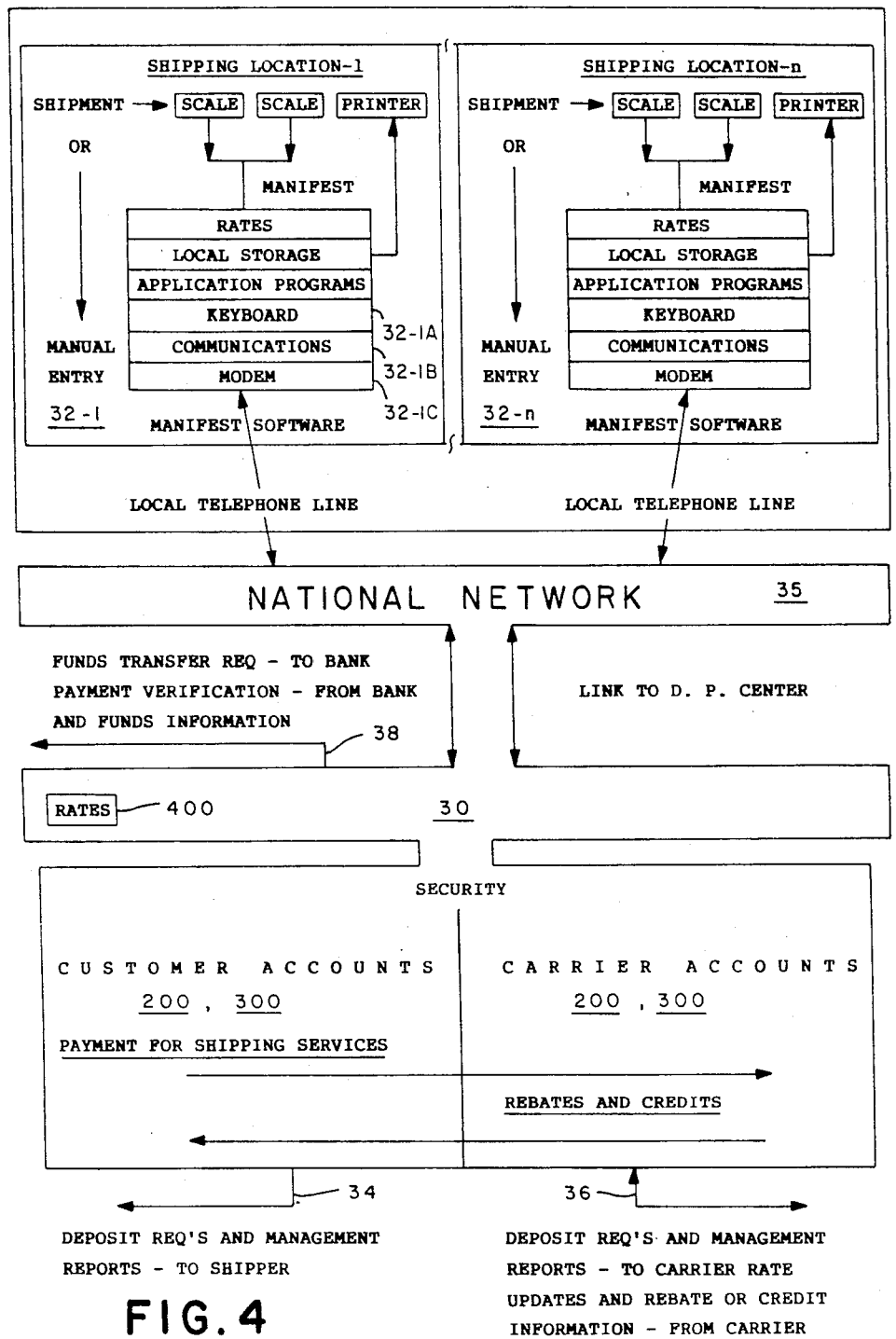
FIG. 4 shows a schematic representation of a data processing center and a plurality of input devices used in the subject invention.

Turning to FIG. 4 there is shown a more detailed depiction of a preferred embodiment of the system of the subject invention. In the embodiment shown in FIG. 4, input device 32 comprises a modified version of a Manifest System such as the system marketed by Pitney Bowes Inc. of Stamford, Conn. as the CPSS System. Manifest systems are microcomputer based systems which input Piece Information from scales, keyboards, wand readers, etc., and generate a Manifest for a shipment based on this Piece Information and stored rates for a carrier. In a conventional Manifest System such as the CPSS, Rates are stored on floppy disks which are replaced from time to time with new disks containing the most recent rates. In general, techniques for determining shipping or mailing costs such as those disclosed in U.S. Pat. No. 4,286,325 are well known and need not be discussed further here for an understanding of the subject invention.

In FIG. 4, Input Devices 32-1 through 32-N are located at shipping locations 1 through N. Input device 32-1 at shipping location 1 is typical and comprises a Manifest System 32-1A modified by the addition of conventional communications hardware and software 32-1B and a modem 32-1C to provide a communications link over the national telephone network 35 to Data Processing Center 30 in a conventional manner. Communications between Input Devices 32-1 through 32-N are handled in a manner which is well understood by those skilled in the art and further details are not necessary to an understanding of the invention. It should also be noted that various well-known error correcting techniques to improve the accuracy of transmission may be used. The communications capability provided by hardware and software 32-1B and modem 32-1C is used to upload blocks of Shipment Information to Data Processing Center 30 for each shipment, and from time to time download current Rates for each shipper on the system from Data Processing Center 30, rather than updating rates by replacement of a local floppy disk.

Input Devices 32 generate Manifests for each shipment in essentially the same manner as the presently marketed CPSS System and preferably provides local hard copies of the Manifest for use by the shipper and/or as a Bill of Lading for the carrier. The information is also stored locally and shipper and carrier identification added, if necessary, to Produce Rated Shipment Information, which is periodically transmitted to Data Processing Center 30.

Typical Shipment Information provided is shown in appended Table 1. This information is used to update the databases for the shipper and carrier involved and the total shipping cost is debited to the shipper's account and credited to the carrier's account. Periodically, statements of accounts and management reports are provided to the carriers and shippers over communications links 34 and 36. Examples of such reports are shown in FIGS. 7 through 9. Carriers also may use communications Channel 36 to provide Data Processing Center 30 with updated rates from time to time. Data Processing Center 30 also includes communication channel 38 for communications with Trustee Bank 40. Data Processing Center 30 may either periodically or upon request by a shipper issue payment instructions to Trustee Bank 40 to debit the shipper's bank account and make appropriate payments to various carriers. Bank 40 also uses communications channel 38 to provide Data Processing Center 30 with information as to the amount of funds available in shipper's accounts, which information Data Processing Center 30 in turn uses to notify shippers when funds are needed in their account with Bank 40. Communications with Bank 40 are preferably carried out in accordance with conventional banking procedures.

As may also be seen from FIG. 3, similar flows of funds and information from Carrier 20 allow Carrier 20 to give rebates and credits to Shipper 10. (By "rebate" herein is meant a transfer of funds, or their equivalent, from a carrier to a shipper, and by "credits", herein is meant an allowance made by a carrier to a shipper against future services.)

The design and implementation of Data Processing Center 30 is a conventional matter of systems design based upon the size of the network of shippers and carriers using the system and the data flows anticipated. With such information, a systems designer of ordinary skill could easily select a properly sized computer, appropriate storage, and appropriate communications apparatus. It should be noted that communications channels 34, 36, and 38 are considered to be completely general; and thus in a small prototype system might comprise linkages through an operator to the currently existing mail, telephone or telex systems or in larger systems might comprise leased or dial-up connections to the telephone network or hardwired connections.

Figure 5:
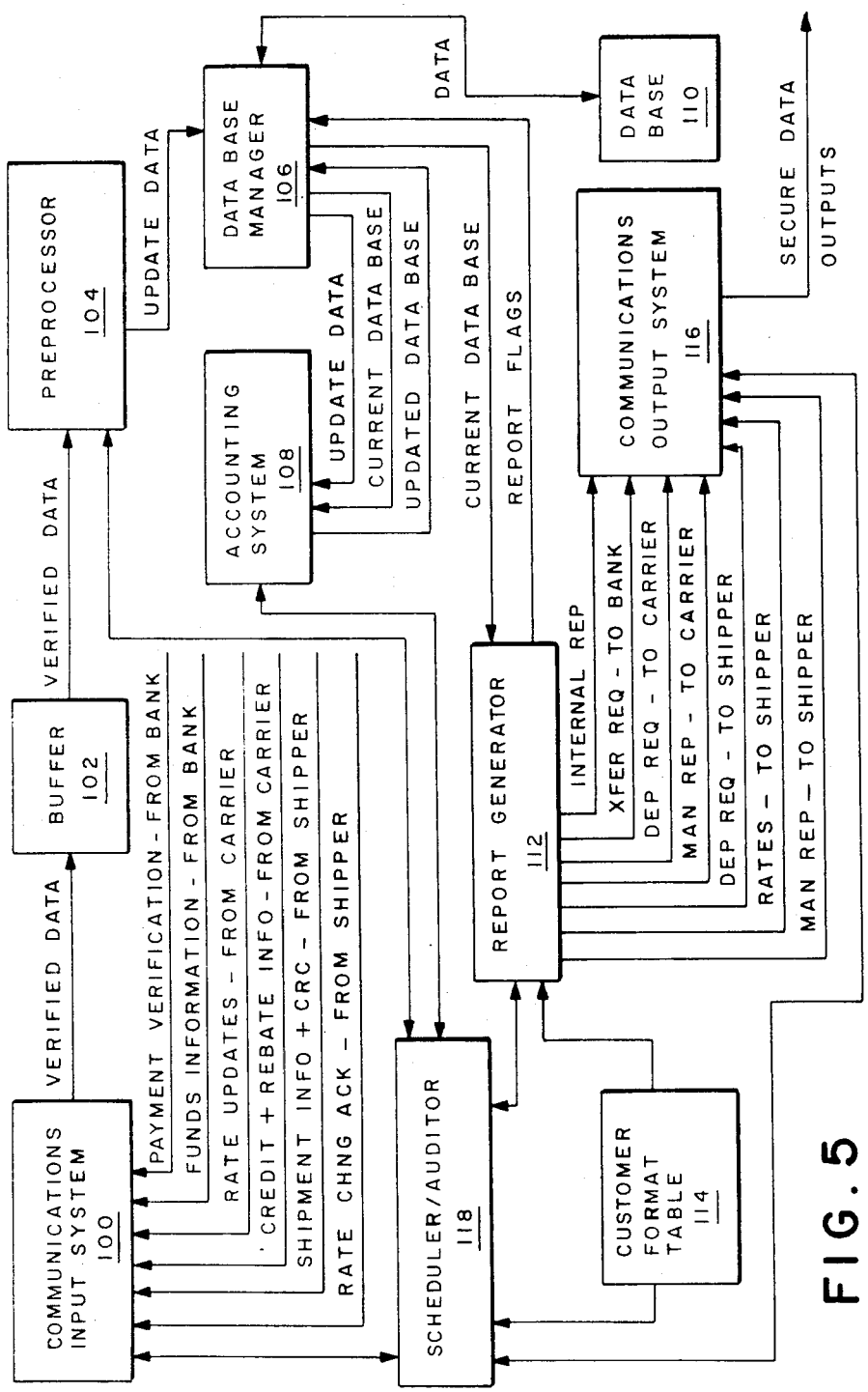
FIG. 5 shows a structure diagram of the software modules and data flows between modules used in the data processing center of FIG. 4.
Figure 6:
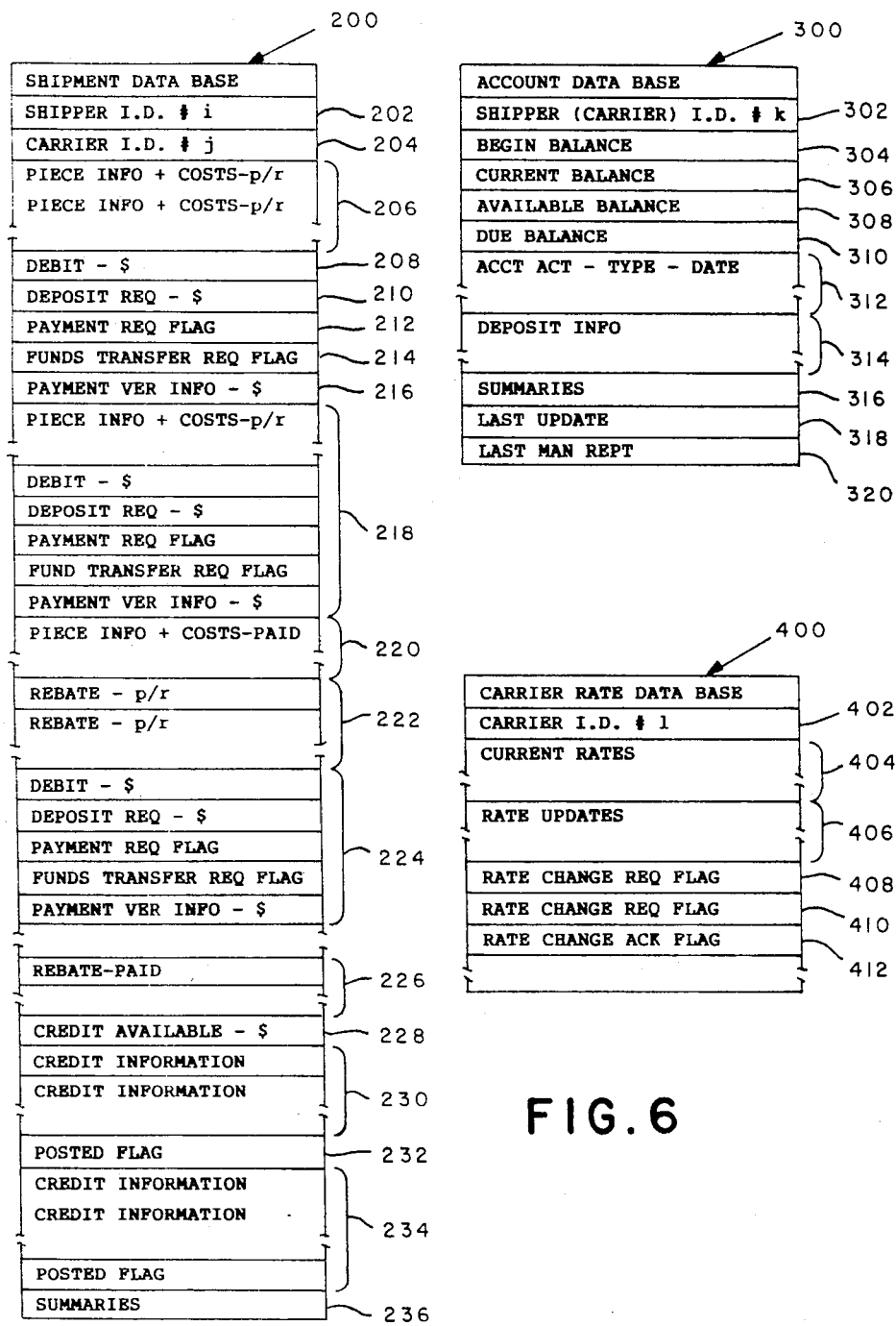
FIG. 6 shows the data structure for the data base of FIG. 5.

Referring to FIGS. 5 and 6, a structural description for the software for Data Processing Center 30 is shown.

FIG. 5 shows a structure diagram of the various software modules used in Data Processing Center 30.

Communications Input System 100 comprises software for receiving various classes of inputs (hereinafter messages). These messages are: Shipment Information from Shippers, Rate Change Acknowledgments from Shippers, Credit and Rebate Information from Carriers, Rate Updates from Carriers, Funds Information from Trustee Bank 40, and Payment Verification from Trustee Bank 40. Shipment Information is transmitted to Data Processing Center 30 electronically, preferably over the dial-up telephone network, and Rate Change Acknowledgments are also preferably transmitted electronically. Preferably the integrity of the Shipment Information is assured by the use of a conventional cyclic redundancy code (hereinafter CRC). The authenticity of the Shipment Information may also be assured by the use of such well-known techniques as encryption, passwords, and/or call-back communications protocols. Other types of messages may be transmitted to Data Processing Center 30 either electronically or through methods involving data entry by an operator; depending upon the number of users of the system and the desired response times.

A more detailed description of the meaning and function of each class of message is set forth below.

Communications Input System 100 verifies the messages received and stores them in Buffer 102.

Preprocessor 104 retrieves the verified data from Buffer 102, makes any necessary changes to the format of the messages contained in the verified data to generate update data for Data Base 110, and transmits the update data to Data Base Manager 106.

Data Base Manager 106 stores and retrieves information from Data Base 110 in response to requests from other software modules in the system in a manner which will be more fully described below.

Accounting System 108 from time to time receives update data and the current data base from Data Base 110 and updates the current data base in accordance with the update data in a manner which will be described more fully below. The updated data base is then returned to Data Base 110.

Report Generator 112 receives the current data base from Data Base 110 and generates various outputs (hereinafter reports) and returns various report flags to Data Base 110 to indicate that particular reports have been generated. The format and times of these reports are specified by parameters stored in Customer Format Table 114. The following reports are generated: Management Reports to Shippers, Rates to Shippers, Deposit Requests to Shippers, Management Reports to Carriers, Deposit Request to Carriers, Transfer Requests to Trustee Bank 40, and Internal Reports. Preferably, the Rates will be transmitted to Shippers electronically over the dial-telephone network but, as with the messages described above, other reports may be transmitted by various means which may include operator intervention. It should be noted that the Internal Reports include such information as data base dumps, error reports, and other information useful in maintaining, debugging, and/or operating the system. Such Internal Reports are well-known and understood by those skilled in the art and need not be described further here for an understanding of the subject invention. Other reports are described more fully below.

Communications Output System 116 provides software for handling the various output devices, including the electronic connection to Input Device 32 and also software for the implementation for any techniques which are desired for error detection/correction and/or assuring report authenticity. It should be noted that it is believed preferable that communications with Trustee Bank 40 be carried out in accordance with established standards in the banking industry for electronic funds transfer.

Scheduler/Auditor 118 has two functions. First it schedules access by various modules to the system resources. That is, it specifies the sequence in which the various modules run. This scheduling may be either event or schedule driven. In smaller systems with relatively few users, it is believed preferable that Scheduler/Auditor 118 be event driven so that as each module completes it task, Schedule/Auditor 118 calls the next needed module. In larger systems with greater numbers of users, its is believed preferable that Scheduler/Auditor 118 sequence the various modules in accordance with a pre-defined schedule. For example, during business hours Communications Input System 100, Buffer 102, Preprocessor 104, and Data Base Manager 106 might be run to store incoming messages; with accounting and report generation scheduled for the late night hours.

The second function of Scheduler/Auditor Auditor 118 is to maintain a detailed audit trail of the operation of the system. It records each message entered, each report generated, and each access to Data Base 110. This audit trail is useful for maintenance and debugging of the system, and, more importantly, provides a high degree of security against attempts by dishonest operators or "hackers" who might try to modify the system to illegally divert funds.

It should be understood that each of the various modules described above represents functions that are well known in the data processing art and a person skilled in the art could easily implement such modules given the specification for a system in accordance with the subject invention in terms of structure, hardware, number of users, desired response time, and anticipated data rates.

FIG. 6 shows the information stored in Data Base 110. Data Base 110 comprises Shipment Data Base 200, Account Data Base 300 and may further comprise Carrier Rate Data Base 400.

Shipment Data Base 200 comprises files associated with each shipper, carrier pair. In FIG. 6 the file for the ith shipper and jth carrier is shown and identified by shipper ID 202 and Carrier ID 204. Piece Information and Costs payable by the shipper 202, and receivable by the carrier 204, represent information periodically uploaded from Input Device 32 identifying particular shipments. Associated with information 206 are a number of variables and flags. Debit 208 represents the dollar amount to be debited from the shipper's account and credited to the carrier's account. Deposit Request 210 represents a dollar amount to be deposited by the shipper if his available balance is not sufficient. Payment Request Flag 212 is a flag set for Report Generator 112 requesting Report Generator 112 to generate a Funds Transfer Request to Trustee Bank 40 for the payment of Debit 208 to the jth carrier. Funds Transfer Requested Flag 214 signals that Report Generator 112 has issued the Funds Transfer Request. Payment Verification Information 216 is returned from Trustee Bank 40 to verify that the requested funds have been transferred. Because of delays in processing, additional information, costs, and associated variables and flags for other shipments maybe stored in Shipment Data Base before information 206 is processed. Such additional information is shown at 218 in FIG. 6. Piece Information and Costs paid 220 is information describing shipments for which the costs have been paid. Rebate Information payable by the carrier and receivable by the shipper is information describing cash rebates paid to the ith shipper by the jth carrier. Associated with Rebate Information 222 are variables and flags 224 which function in an identical manner to those described above. Rebate Information paid 226 similarly stores information about rebates paid. Credit Available 228 is a variable representing the amount of credit advanced by the jth carrier to the ith shipper against future charges. Credit Information 230 is a chronological record of credits issued. Posted Flag 232 is a flag set when the total amount of credit identified by Credit Information 230 is added to Credit Available 228. Other Credit Information and its associated Posted Flag are shown at 234.

Summaries 236 represent various summaries of the above information which maybe necessary for the generation of management reports as will be described below. Such summaries need not be included in the Data Base but may, alternatively, be generated by Report Generator when the management reports are generated.

Account Data Base 300 comprises files for each shipper or carrier representing the status of that shipper or carrier's account at Trustee Bank 40. In FIG. 6 the account file for the kth shipper (carrier) is identified by ID 302. Beginning Balance 304 represents the balance at the beginning of the current reporting period, Current Balance 306 represents the current balance, Available Balance 308 represents the current balance less any amounts due but not yet paid, and Due Balance 310 represents the sum of any amounts receivable but not yet paid. Account Activity 312 represents a chronological record of the activity of the kth shippers account. Deposit Information 314 is information received from Trustee Bank 40 specifying deposits made to the account. Summaries 316 maybe included to simplify report generation as described above. Last Update 318 and Last Management Report 320 are variables identifying the date of the last update of the account file of the kth shipper and the date of the last Management Report to the kth shipper.

Data Base 110 may also include Carrier Rate Data Base 400 for each carrier. In FIG. 6 the file for the lth carrier is identified by ID 402. Current Rates 404 represents the rates currently in effect for the lth carrier. Rate Updates 406 represents information specifying new rates received from the lth carrier. Rate Change Request Flag 408 is a flag which requests Report Generator 112 to transmit new rates to all shippers. Rate Change Requested Flag is a flag set by Report Generator 112 indicating that a new set of rates has been transmitted to the shippers. Rate Change Acknowledged Flags 412 are flags representing acknowledgement by each shipper that it has received the new rates.

It should be noted that it is within the completion of the subject invention that carriers may wish to have different Rates for different shippers or classes of shippers. In this event, files identified by carrier, shipper pairs could easily be implemented in essentially the same manner described above.

The system of the present embodiment of the subject invention interacts with users to perform 6 basic functions which will be described further below. Additionally, the system also generates Internal Reports as described above. For each basic function the system responds to input messages and/or generates output reports. Each of the various classes of input messages shown in FIG. 5 are received by Communications Input System 100 which verifies the data received. Preferably, verification will include CRC Check to verify message integrity and may include other procedures such as passwords to verify authenticity of the source. System 100 then stores the Verified Data in Buffer 102. In response to Scheduler/Auditor 118, Preprocessor 104 retrieves the Verified Data from Buffer 102, reformats the Verified Data, as necessary, to conform to the system formats and transmits Update Data to the Data Base Manager 106 which stores it in Data Base 110. Output from the system consists of reports from Report Generator 112. Report Generator 112 responds to Scheduler/Auditor 118 to periodically examine Data Base 110 to retrieve information for the generation of output reports. These reports are generated in a format stored in Customer Format Table 114. Table 114 may also store scheduling information for the generation of reports, such as Management Reports, which are desired by users on a scheduled basis. Reports are transmitted by Report Generator 112 to Communications Output System 116. System 116 handles the routine housekeeping functions for communication through the various output channels used by the system and implements whatever functions are considered necessary to secure the data in terms of accuracy, confidentiality, and/or authenticity.

Since each basic function of a system involves the same techniques for input and output it will be understood that reference in the descriptions in the basic functions set forth below to information or messages "received" or "outputs generated" refers to the operations described immediately above.

SHIPMENT

The Shipment Function begins when Input Device 32 transmits a block of Shipment Information describing one or more Shipments to Communications Input System 100. In the preferred embodiment shown this Shipment Information will be rated by Input Device 32, however, it is within the contemplation of the subject invention that the Shipment Information maybe Rated by Data Processing Center 30. The information is received and Piece Information and Costs for each item shipped by the ith shipper through the jth carrier is stored in Shipment Data Base at 206. Then, in response to Scheduler/Auditor 118, Accounting System 108, accesses Data Base 110 and calculates Debit 208 as the difference between the sum of Costs 206 and Credit Available 228, to a minimum of zero, and accordingly updates Credit Available 228. Accounting System 108 then subtracts Debit 208 from Available Balance 308 for the ith shipper. If Available Balance 308 is insufficient, Accounting System 108 restores Balance 308 and Credit Available 228 and sets Deposit Request 210 with the necessary amount of deposit. System 108 then adds Debit 208 to due Balance 310 for the jth carrier and takes no further action until a deposit is made in a manner which will be described below. When Available Balance 308 exceeds Debit 208, Accounting System 108 sets Payment Request Flag 212 (and again updates Credit Available 228 and Balance 308, if necessary). In response to Scheduler/Auditor 118, Report Generator 112 then accesses Data Base 110. In response to Payment Request Flag 212, Report Generator 112 generates a Funds Transfer Request to Trustee Bank 40 to transfer funds equal to Debit 208 from the account of the ith shipper to the account of the jth carrier and sets Funds Transfer Requested Flag 214. When Trustee Bank 40 makes the funds transfer it returns a Payment Verification to Input System 100. This information is received and stored in Payment Verification Information 216. When Accounting System 108 next accesses Shipment Data Base 200 in response to Payment Verification Information 216 it transfers Piece Information and Costs payable/receivable 206 to Piece Information and Costs paid 20, subtracts Debit 208 from Current Balance 306 of the ith shipper and adds it to Current Balance 306 of the jth carrier, adds Debit 208 to Available Balance 308 of the jth carrier and subtracts it from Due Balance 310 of the jth carrier. Payments and receipts are then recorded in Account Activity 312 for both the ith shipper and the jth carrier.

It should be noted that a "rate shopping" function is within the contemplation of the subject invention. For such a "shopping" function Shipment Information for a hypothetical Shipment would be Rated as described above, without however accounting for or paying the costs determined. Instead the costs (including any Discounts) are returned to the shipper for comparison with the costs of other carriers.

REBATES

Rebates represent a cash payment from a shipper to a carrier and are initiated when Rebate Information is received by the system. The system then acts in a manner complimentary to that described for Shipments above, except that rebates are payments from carriers to shippers. The necessary data elements are stored in Shipment Data Base 200 at 222, 224, and 226.

CREDITS

A Credit Function is initiated by receipt of a Credit Information Message by the system. Credit Information is stored in Data Base 110 at 230. When Accounting System 108 next accesses Data Base 110, it adds the sum of Credit Information 230 to Credit Available 228 and sets posted Flag 232. Additional Credit Information may then be stored at 234.

DEPOSIT

The Deposit Function maybe initiated either when Report Generator 108 generates a Deposit Request in response to a Deposit Request Flag set by Accounting System 108 or it may be initiated when a user decides to add funds to his account with Trustee Bank 40 on its own initiative. It is within the contemplation of the subject invention that users may maintain lines of credit with Trustee Bank 40 and Deposit Requests may be sent to Bank 40 directly. When Bank 40 receives the funds it transmits a Funds Information message to the system. The information is received and stored in Account Data Base 300 as Deposit Information 314 for the appropriate shipper or carrier. When Accounting System 108 next accesses Account Data Base 300, it adds the sum of all deposits stored in Deposit Information 314 to Current Balance and Available Balance 306 and 308 and transfers Deposit Information 314 to Account Activity 312.

MANAGEMENT REPORTS

Management Reports are generated by Report Generator 12 which accesses Data Base 110 on a scheduled basis as determined by the requests of the users and stored in Customer Format Table 114. Report Generator 112 retrieves the necessary information from Data Base 110 and transmits it to Communications Output System 116 in a predetermined format stored in Customer Format Table 114. (As noted above, summaries included in the Management Reports may either be computed by Accounting System 108 and stored as Summaries 236 and 316, or maybe calculated by Report Generator 112.)

Typical reports to a shipper are shown in FIGS. 7 through 9 which will be described more fully below. It will be readily apparent that similar reports could be generated for carriers.

FIG. 7 shows a summary Shipment Report for a period from date 502 through date 504. Dates 502 and 504 are taken from Account Data Base 300 beginning date 502 being stored in Last Update 318 by Accounting System 108 at the time of the last update and ending date 504 being taken from Last Management Report 320 where it was stored by Report Generator 112 at the time of the last management report. Field 506 identifies the shipper. Field 508 gives the totals for various elements of activity for the reporting period. Field 510 breaks down the totals in Field 508 by particular carrier.

FIG. 8 shows a continuation of the Shipment Report which provides a detailed breakdown by carrier of the information summarized above. Field 512 identifies a carrier. Field 514 defines codes for the mode (or class of service) and Field 516 defines codes for special fees. Field 518 repeats the summary information for the carrier identified in Field 512. Field 520 provides a chronological breakdown of shipment activity with the carrier identified in 512. Similar reports (not shown) are of course provided for all other carriers active in that period. FIG. 9 shows an Account Activity Report for the period beginning with date 602 and ending with date 604. These dates are taken from Last Management Report 320 and Last Update 318. Field 600 identifies the shipper. Field 606 summarizes the account activity for the period. Field 608 is a chronological report of the account activity for the period.

RATE CHANGE

The Rate Change Function is initiated when the system receives Rate Update information from a carrier. The information is stored in Rate Updates 406 of Carrier Rate Data Base 400. When Accounting System 108 next accesses Data Base 110, it updates Current Rates 404 with rate updates 406 to generate new current rates and set Rate Change Request Flag 408. When Report Generator 112 next accesses Data Base 110, it generates a Rates Report to all shippers and sets the Rate Change Requested Flag 410. Each shipper acknowledges the new Rates by transmitting a Rate Change Acknowledge Message which is received and is stored in Rate Change Acknowledge Flags 412. It should be noted that it is also within the contemplation of the subject invention to implement a time dependent rate schedule. That is a rate schedule where rates would change at predetermined times (e.g., special rates for off hour shipments). Such Rates could be stored in the system and Current Rates 404 updated in response to a schedule stored in Customer Format Table 114.

Detailed descriptions of preferred embodiments of the subject invention as described above and illustrated in the attached figures have been provided by way of illustration only. Those skilled in the art will readily recognize many other embodiments which are within the scope of the subject invention. In particular, systems in accordance with the subject invention could prove useful in simplifying the accounting and payment function in any situation where a number of buyers engage in a large number of Transactions with one or more sellers. Accordingly, limitations on the subject invention are to be found only in the claims set forth below.

TABLE 1—SHIPMENT INFORMATION (TYP.)
TRANSACTION #
INVOICE #
SERVICE - - MODE OF SHIPMENT
WEIGHT
ZIP CODE
ZONE
TOTAL SHIPPING COST
ACCOUNT NUMBER
DECLARED VALUE
COD
AOD
OVERSIZE (PARCEL)
RATED WEIGHT
TRANSACTION DATE
TRANSACTION TIME

What is claimed is:

1. A system for accounting for Transaction costs comprising:
   (a) input means for inputting Item Information and for producing Transaction Information in accordance with said Item Information, said input means being located at the premises of a buyer;
   (b) data processing means responsive to said Transaction Information for:
      (b1) maintaining accounts for said buyer and a group of sellers consisting of at least one seller;
      (b2) determining Transaction costs and identifying a seller from said group in accordance with said Transaction Information;
      (b3) debiting said account of said buyer for the amount of said Transaction costs and crediting said account of said identified seller with said amount;
      (b4) generating statements of their account for said buyer and said group of sellers; and,
      (b5) after debiting said buyer's account said data processing system determining if additional funds are needed to cover said Transaction costs and, if so, generating an output to said buyer advising said buyer of the need for additional funds; and,
   (c) communications means for transmitting said Transaction Information from said input means to said data processing means.

2. A system as described in claim 1 wherein said data processing means further comprises a data base system means for maintaining a data base and is further responsive to said Transaction Information for:
   (a) storing Item information and Transaction costs in a first file in said data base, said file being associated with said buyer and said identified seller; and, (b) debiting and crediting said accounts in accordance with said Transaction costs stored in said first file, said accounts being stored in account files in said data base.

3. A system for accounting for Transaction costs, comprising:
(a) input means for inputting Item Information and for producing Transaction Information in accordance with said Item Information, said input means being located at the premises of a buyer;
(b) data processing means responsive to said Transaction Information for:
  (b1) maintaining accounts for said buyer and a group of sellers consisting of at least one seller;
  (b2) determining Transaction costs and identifying a seller from said group in accordance with said Transaction Information;
  (b3) debiting said account of said buyer for the amount of said Transaction costs and crediting said account of said identified seller with said amount;
  (b4) generating statements of their account for said buyer and said group of sellers; and,
  (b5) storing Rates; and wherein said Transaction Information is received in the form of Unrated Transaction Information, said data processing means Rating said Transaction Information to determine said Transaction costs; and,
(c) communications, means for transmitting said Transaction Information from said input means to said data processing means.

4. A system for accounting for Transaction costs, comprising:
(a) input means for inputting item Information and for producing Transactions Information in accordance with said Item Information, said input means being located at the premises of a buyer;
(b) data processing means responsive to said Transaction Information for:
  (b1) maintaining accounts for said buyer and a group of sellers consisting of at least one seller;
  (b2) determining Transaction costs and identifying a seller from said group in accordance with said Transaction Information;
  (b3) debiting said account of said buyer for the amount of said Transaction costs and crediting said account of said identified seller with said amount;
  (b4) generating statements of their account for said buyer and said group of sellers; and,
(c) communications means for transmitting said Transaction Information from said input means to said data processing means.
(d) second communications means for transmitting credit information defining an amount to be credited to said buyer against future transactions between said buyer and said identified seller from said identified seller to said data processing means; and
(e) said data processing means being further responsive to said credit information to store said credit information in said first file;
(f) wherein said data processing means further comprises a data base system means for maintaining a data base and is further responsive to said Transaction Information for:
  (f1) storing Item Information and Transaction costs in a first file in said data base, and file being associated with said buyer and said identified seller; and,
  (f2) debiting and crediting said accounts in accordance with said Transaction costs stored in said first file, said accounts being stored in account files in said data base.

5. A system as described in claim 4 wherein said data processing means offsets said amount identified by said credit information stored in said first file against said Transaction costs.

6. A system as described in claim 4 wherein said amount to be credited is equal to a Discount determined from the Rates of said identified seller.

7. A system as described in claim 6 wherein said amount to be paid is equal to a Discount determined from the Rates of said identified seller.

8. A system for accounting for Transaction costs, comprising:
(a) input means for inputting Item Information and for producing Transaction Information in accordance with said Item information, said input means being located at the premises of a buyer;
(b) data processing means responsive to said Transaction Information for:
  (b1) maintaining accounts for said buyer and a group of sellers consisting of at least one seller;
  (b2) determining Transaction costs and identifying a seller from said group in accordance with said Transaction Information;
  (b3) debiting said account of said buyer for the amount of said Transaction costs and crediting said account of said identified seller with said amount;
  (b4) generating statements of their account for said buyer and said group of sellers; and,
(c) communications means for transmitting said Transaction Information from said input means to said data processing means;
(d) wherein said buyer maintains a funds account with a custodian, and said system further comprises third communication means for communicating between said custodian and said data processing means and said data processing means periodically instructs said custodian to debit said buyer's funds account for the total amount due from said buyer to said group of seller and to issue appropriate payments to each of said sellers; and
(e) wherein further, after debiting said buyer's account said data processing system determines if additional funds are needed in said funds account to cover said Transaction costs and, if so, generates an output to said buyer advising said buyer of the need to deposit additional funds with said custodian.

9. A system for accounting for shipment costs, comprising:
(a) input means for inputting Piece Information and for producing Shipment Information in accordance with said Piece Information, said input means being located at the premises of a shipper;
(b) data processing means responsive to said Shipment Information for:
  (b1) maintaining accounts for said buyer and a group of carriers, consisting of at least one carrier;
  (b2) determining Shipment Costs and identifying a carrier from said group in accordance with said Shipment Information;

(b3) debiting said account of said shipper for the amount of said Shipment costs and crediting said account of said identified carrier with said amount; and, (b4) generating statements of their account for said shipper and said group of carriers; and, (b5) after debiting said shipper's account said data processing system determining if additional funds are needed to cover said Shipment costs and, if so, generating an output to said shipper advising said shipper of the need for additional funds.

10. A system as described in claim 9 wherein said data processing means further comprises a data base system means for maintaining a data base and is further responsive to said Shipment Information for:

(a) storing Piece Information and Shipment costs in a first file in said data base, said file being associated with said shipper and said identified carrier; and, (b) debiting and crediting said accounts in accordance with said Shipment costs stored in said first file, said accounts being stored in account files in said data base.

11. A system for accounting for shipment costs, comprising:

(a) input means for inputting Piece Information and for producing Shipment Information in accordance with said Piece Information, said input means being located at the premises of a shipper;

(b) data processing means responsive to said Shipment Information for:

(b1) maintaining accounts for said buyer and a group of carriers, consisting of at least one carrier;

(b2) determining Shipment Costs and identifying a carrier from said group in accordance with said Shipment Information;

(b3) debiting said account of said shipper for the amount of said Shipment costs and crediting said account of said identified carrier with said amount; and, (b4) generating statements of their account for said shipper and said group of carriers; and, (b5) storing Rates and said Shipment Information is received in the form of Unrated Transaction Information, said data processing means Rating said Shipment Information to determine said shipping costs; and, (c) communications means for transmitting said Shipment Information from said input means to said data processing means.

12. A system for accounting for shipment costs, comprising:

(a) input means for inputting Piece Information and for producing Shipment Information in accordance with said Piece Information, said input means being located at the premises of a shipper;

(b) data processing means responsive to said Shipment Information for:

(b1) maintaining accounts for said buyer and a group of carriers, consisting of at least one carrier;

(b2) determining Shipment Costs and identifying a carrier from said group in accordance with said Shipment Information;

(b3) debiting said account of said shipper for the amount of said Shipment costs and crediting said account of said identified carrier with said amount; and, (b4) generating statements of their account for said shipper and said group of carriers; and, (c) communications means for transmitting said Shipment Information from said input means to said data processing means.

(d) second communication means for transmitting information defining an amount to be credited to said shipper against future transactions between said shipper and said identified carrier from said identified carrier to said data processing means; and, (e) said data processing means being further responsive to said credit information to store said credit information in said first file;

(f) wherein said data processing means further comprises a data base system means for maintaining a data base and is further responsive to said Shipment Information for:

(f1) storing Piece Information and Shipment costs in a first file in said data base, said file being associated with said shipper and said identified carrier; and, (f2) debiting and crediting said accounts in accordance with said Shipment costs stored in said first file, said accounts being stored in account files in said data base.

13. A system as described in claim 12 wherein said data processing means offsets said amount identified by said credit information stored in said first file against said Shipment costs.

14. A system as described in claim 12 wherein said amount to be credited is equal to a Discount determined from the Rates of said identified carrier.

15. A system as described in claim 12 wherein said amount to be paid is equal to a Discount determined from the Rates of said identified carrier.

16. A system for accounting for shipment costs, comprising:

(a) input means for inputting Piece Information and for producing Shipment Information in accordance with said Piece Information, said input means being located at the premises of a shipper;

(b) data processing means responsive to said Shipment Information for:

(b1) maintaining accounts for said buyer and a group of carriers, consisting of at least one carrier;

(b2) determining Shipment Costs and identifying a carrier from said group in accordance with said Shipment Information;

(b3) debiting said account of said shipper for the amount of said Shipment costs and crediting said account of said identified carrier with said amount; and, (b4) generating statements of their account for said shipper and said group of carriers; and, (c) communications means for transmitting said Shipment Information from said input means to said data processing means.

(d) wherein said shipper maintains a funds account with a custodian, and said system further comprises third communication means for communicating between said custodian and said data processing means and said data processing means periodically instructs said custodian to debit said shipper's funds account for the total amount due from said shipper to said group of carriers and to issue appropriate payments to each of said carriers; and,
(e) wherein further after debiting said shipper's account said data processing system determines if additional funds are needed in said funds account to cover said Shipment costs and, if so, generates an output to said shipper advising said shipper of the need to deposit additional funds with said custodian.

* * * * *